United States Patent

Cosenza

[11] Patent Number: 5,452,979
[45] Date of Patent: Sep. 26, 1995

[54] FASTENER ASSEMBLY

[75] Inventor: Frank J. Cosenza, Santa Barbara, Calif.

[73] Assignee: VSI Corporation, Chantilly, Va.

[21] Appl. No.: 225,682

[22] Filed: Apr. 11, 1994

[51] Int. Cl.⁶ ................................... F16B 21/00
[52] U.S. Cl. ............................................. 411/348
[58] Field of Search ........................ 411/348, 347, 411/352, 549; 24/453, 607, 628; 292/252

[56] References Cited

U.S. PATENT DOCUMENTS

| | | | |
|---|---|---|---|
| 2,901,804 | 9/1959 | Williams | 411/348 |
| 3,233,496 | 2/1966 | Pew et al. | 411/348 |
| 3,430,305 | 3/1969 | Geffner | 411/348 X |
| 3,793,685 | 2/1974 | Knecht | 411/348 X |
| 3,827,110 | 8/1974 | Deus | 411/348 X |
| 3,980,327 | 9/1976 | Duran | 411/348 X |
| 4,111,477 | 9/1978 | Rigali | 292/252 |
| 5,207,544 | 5/1993 | Yamamoto et al. | 411/348 |

FOREIGN PATENT DOCUMENTS

| | | | |
|---|---|---|---|
| 897080 | 3/1945 | France | 411/348 |
| 575355 | 2/1946 | United Kingdom | 411/348 |
| 971537 | 9/1964 | United Kingdom | 411/348 |

Primary Examiner—Peter M. Cuomo
Assistant Examiner—Jerry Redman
Attorney, Agent, or Firm—Irving Keschner

[57] ABSTRACT

A fastener assembly for securing a first panel member to a second panel member in a spaced-apart relationship. The fastener comprises a tubular shank portion having first and second end portions, a cavity being formed in the shank portion. A first spring member is secured on the outside of the shank portion and has openings near the first end of the shank portion to enable steel ball members to protrude therefrom. Inside the shank portion cavity is a stepped pin member that is spring loaded and held in place by a combination of the shank portion spring ball retention feature and step angles formed on the pin member. A tubular shaped member is positioned adjacent the exterior surface of the ball members to ensure that the ball members do not extract themselves from their position within the cavity in case vibrations exceed time and frequency specifications.

11 Claims, 6 Drawing Sheets

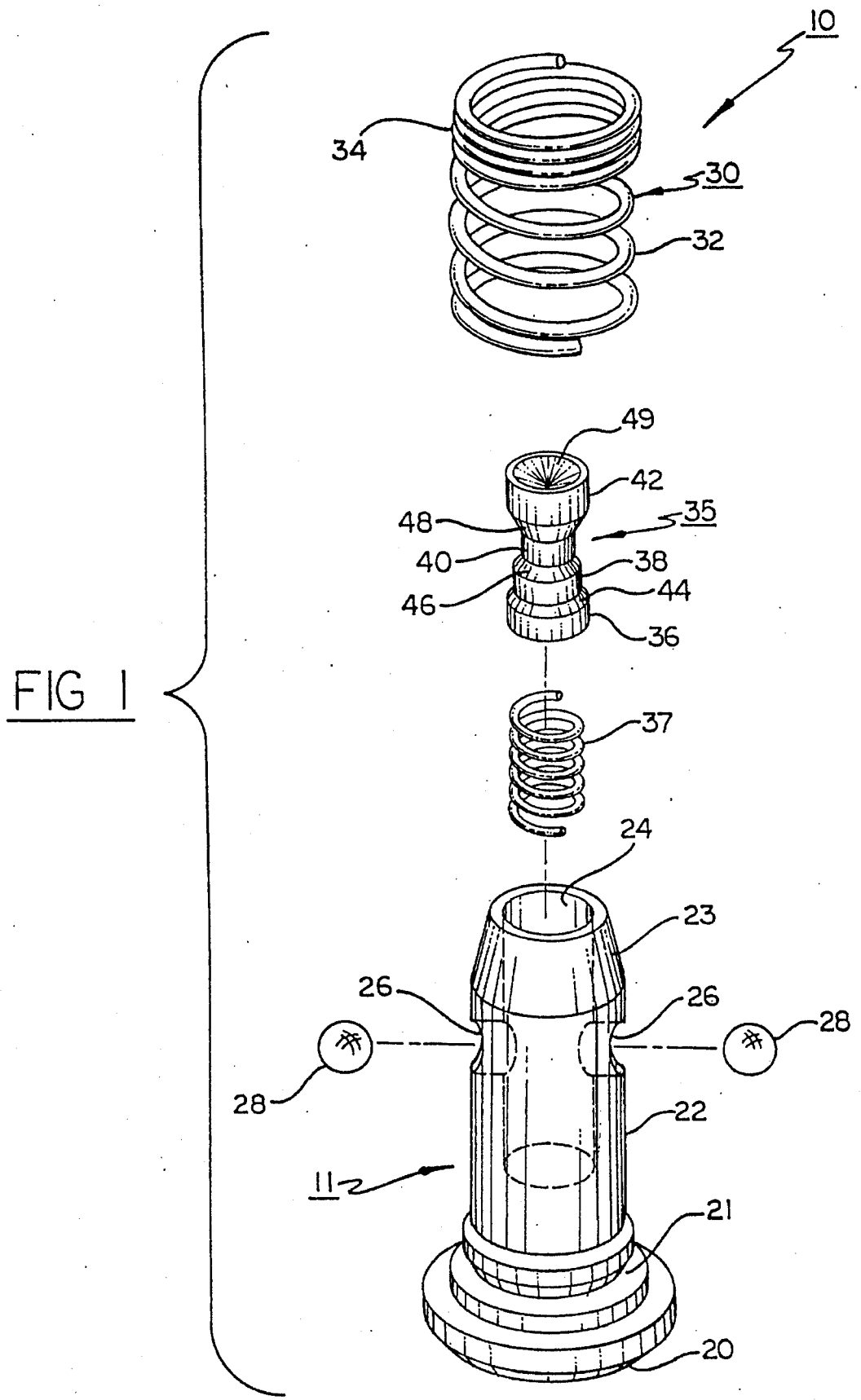

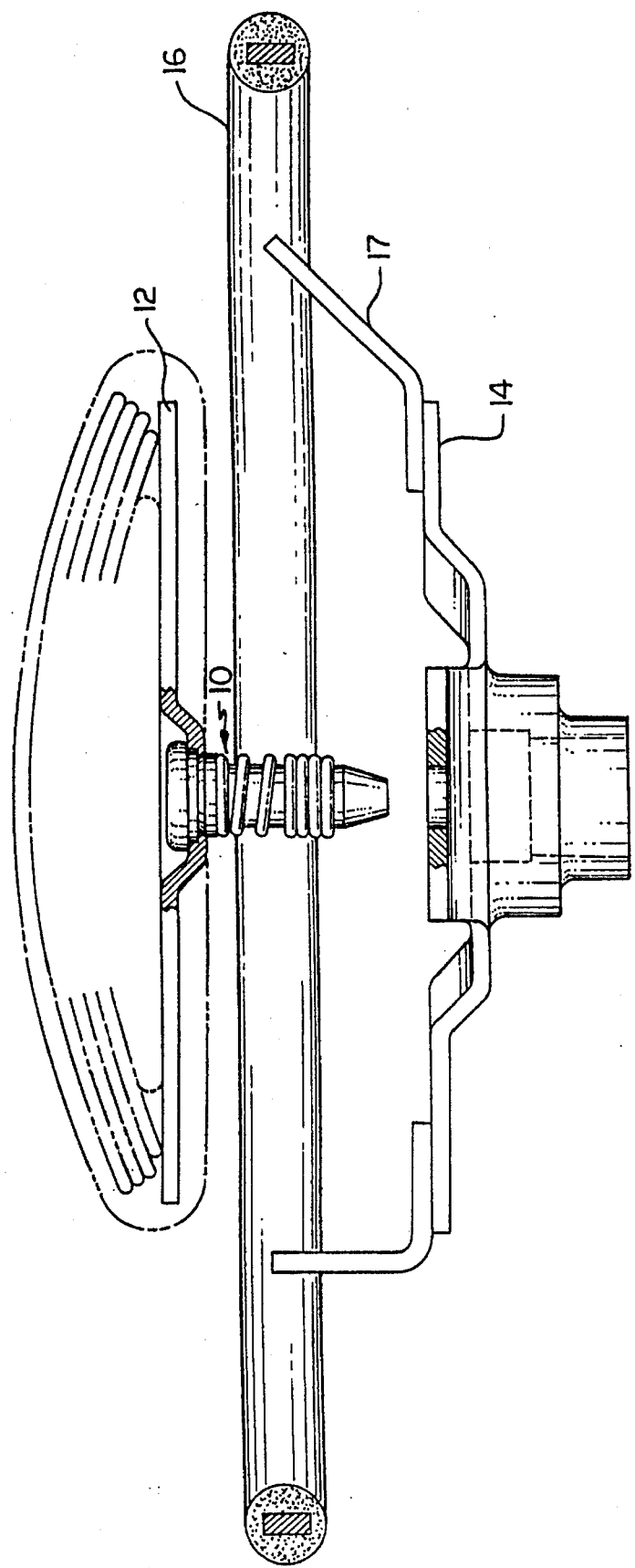

FASTENER ASSEMBLY

BACKGROUND OF THE INVENTION

1. Field of the Invention

The present invention relates to improvements in push button type fasteners wherein the fastener can be both quickly installed and released.

2. Description of the Prior Art

Many systems wherein at least two members are mechanically joined require that the members be capable of being fastened together and separated quickly and simply for maintainability purposes. For example, in the assembly of an automotive airbag to the steering column and wheel, the airbag mechanism typically is attached by four screws that are threaded into tubular standoffs that are attached to a plate that the airbag is secured to. As the airbag is one of the last items to be assembled on the almost finished vehicle, its accessibility is very limited. Therefore the time required to assemble the airbag to the steering wheel assembly is longer than desired because the screws have to be inserted from behind the steering wheel. The convenience of installation is severely hampered due to the natural obstructions that accompany any automobile such as a gear selector lever, the turn signal stalk, the steering wheel post shroud and the proximity of the dashboard. The installation may also require the steering wheel to be rotated to a certain position in order to access all four holes; in addition the aligning of the screw to its mating threads in a blind application is difficult. The same problems occur during the check out cycle if a malfunction occurs or at a later time during normal servicing at the dealer's facility. The current practice of locating the holes for the airbag assembly and to install the four screws is slow and expensive.

The reduction in time required to remove the installed airbag, i.e., due to a mechanical defect or after deployment is more than desired due both to the absence of a trained mechanic who normally installs airbags and to the cramped quarters which prohibits the use of power tools. The current time consuming system thus requires rotation of the steering wheel to certain positions to provide access and the unloosening and removal of the four screws.

A number of fastener assemblies for joining two members together which does not require the use of a nut are available in the prior art. For example, U.S. Pat. No, 5,011,355 to Motoshige discloses a pushbutton type fastener which utilizes a stud assembly snap-fitted into one of two panels to be joined, a mating socket being snap fit to the other panel. The two components are secured together by pushing a stud in the stud assembly toward the socket. The stud assembly is released from the socket by rotating the stud enabling a spring to urge the stud out of its engagement with the socket.

Although the pushbutton fastener of the type illustrated in the Motoshige patent satisfactorily performs its function of releasably joining two panels together, the fastener requires a number of mechanical parts to perform its function, thus increasing its cost and complexity. In addition, certain applications, such as the airbag installation/maintenance procedure noted hereinabove, requires access to the rear (non-head) portion of the fastener assembly to release it. Since the Motoshige type pushbutton fastener is releasable by rotating the head portion of the stud portion of the stud assembly, it would not be adaptable for use in that application.

The fastener disclosed in U.S. Pat. No. 5,207,544 addressed the above problem by providing a push button type fastener that requires fewer components and wherein panels joined together by the fastener can be quickly released by accessing the fastener at the end opposite its head portion, features which are useful in many applications.

In many situations, testing parameters are often established to simulate as closely as possible the perceived environment the fastener may be exposed to during the life cycle of the product in which the fastener is utilized. These test parameters may include extra tests, such as high frequency, long period vibration tests, in addition to those normally required.

In order to ensure that the locking ball members described in the aforementioned patent are prevented from extracting themselves from the operating position if the product is ever subjected to vibrations which exceed the specified limits in time and frequency, it is desired to provide a mechanism which accomplishes this in a relatively simple and inexpensive manner.

SUMMARY OF THE PRESENT INVENTION

The present invention provides a fastener assembly for securing a first panel member to a second panel member in a spaced apart relationship. The fastener assembly comprises a tubular shank portion having first and second end portions and a cavity formed in said shank portion. A first spring member is secured on the outside of the shank portion, the shank portion having openings formed to enable hardened steel ball members to protrude therefrom. Inside the shank portion cavity is a stepped pin member spring loaded and held in place by a combination of the shank portion spring ball retention feature and step angles formed on the pin member. The ball members are in the retracted position until usage, held there by a first spring member. When the fastener is pushed into an aperture formed in the second panel member, the first spring member is compressed back toward the first end of said shank portion and moves away from the ball members it normally forces inward. As the fastener passes through the aperture, the ball members are still in the retracted position since the aperture diameter is approximately the same size as the inside diameter of the first spring member that previously contained it in the shank openings. When the fastener pushes through the aperture and beyond the ball members, a second spring member, positioned behind the pin member, pushes the pin forward and forces the ball members to expand radially, thus securing itself to the second panel member completing the installation. At this point, there is a compressive load between the retracted first spring on the panel member and the radially expanded locked ball members. To remove the fastener, a tool is inserted in a recess formed in said pin member and the pin is pushed axially backward toward the first end of said shank portion, compressing the second spring member and allowing the ball members to retract inwardly. As the ball members are retracted to the proper depth, the fastener exits the hole due to the compressed first spring ejection load and the first panel member is free to be removed. Simultaneously, the first spring member positions itself over the ball members to maintain them in the retracted position. A tubular shaped member is positioned adjacent the exterior surface of the ball member to ensure that the ball members do not extract themselves from their position within the shank cavity in case vibrations exceed time and frequency specifications.

The present invention thus provides a novel pushbutton type fastener that requires fewer components and wherein the panels joined together by the fastener can be quickly released by accessing the fastener at the end opposite its head portion, a feature required in many applications.

The reduction in the number of components necessary to fabricate the fastener of the present invention increases reliability of the fastener while reducing its fabrication cost. In addition, the operational integrity of the fastener assembly is maintained for a wide range of vibration parameters.

DESCRIPTION OF THE DRAWING

For a better understanding of the invention as well as other objects and further features thereof, reference is made to the following description which is to be read in conjunction with the accompanying drawing wherein:

FIG. 1 is an assembly view of a fastener utilized in the present invention;

FIG. 2 illustrates a fastener utilized to secure an air bag support plate member to a vehicle steering mounting support;

DESCRIPTION OF THE INVENTION

Figure 3A:
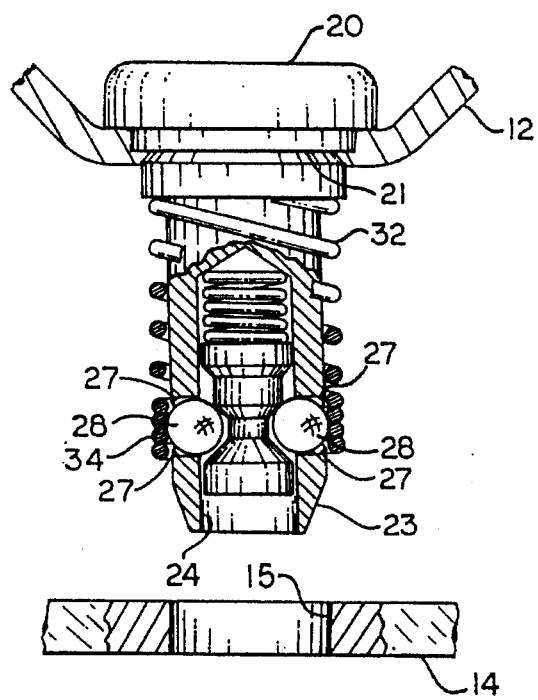
FIGS. 3(a) through 3(c) illustrate the steps of securing two plate members together and FIG. 3(d) illustrates how the two plate members are released.

In order to place the following discussion in proper perspective, a description of the fastener assembly disclosed and claimed in U.S. Pat. No. 5,207,544 with which the protective member of the present invention is utilized is first set forth hereinafter.

Referring now to FIGS. 1–4, an assembly view of a pushbutton type fastener 10 according to the present invention is illustrated (FIG. 1). While pushbutton fastener 10 can be utilized to join together various types of members, one important application is that shown in FIG. 2 wherein an air bag support plate member 12 is secured to a vehicle steering wheel support member 14, member 14 supporting steering wheel 16 via plate member 17. As has been noted hereinabove, it has been determined that for installation and repair purposes it is advantageous to enable access to the fastener 10 through its rear, or non-head portion end, due to the nature of the airbag installation.

Figure 3B:
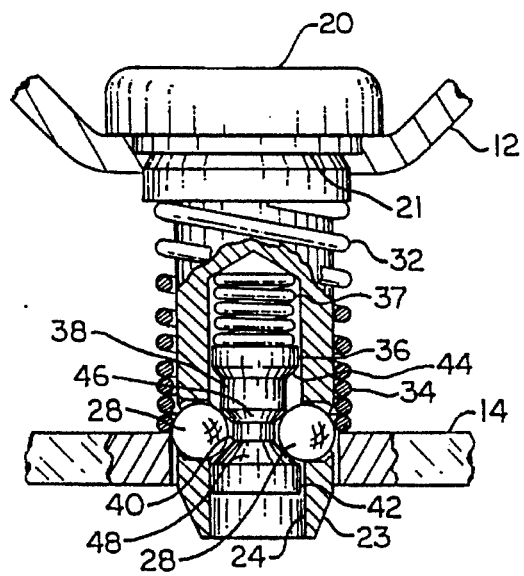
Figure 3C:
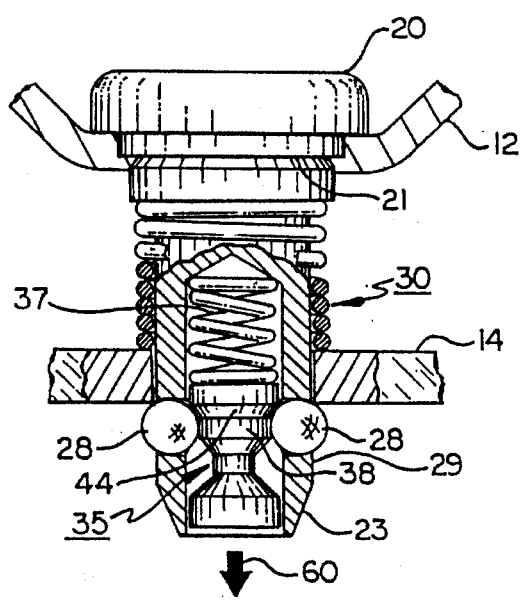
Figure 3D:
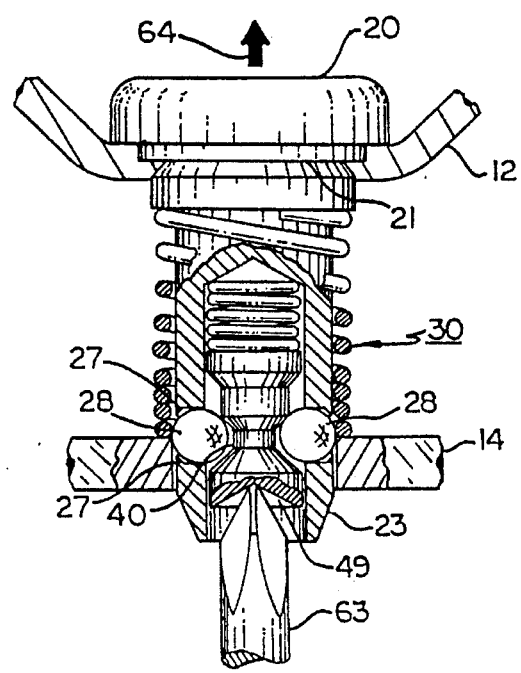

Fastener 10 comprises a stud 11 having a head 20 and a shank portion 22 with probe end 23, shank portion 22 having a hollow portion, or aperture, 24 formed therein as illustrated. A plurality of openings 26 (although only two holes are illustrated, one or more holes could be provided) are formed in the shank portion 22. Positioned within the holes are corresponding hardened steel balls 28. Compression spring member 30 is formed around the outside surface of shank portion 22. As illustrated in FIG. 3(a), spring 30 is designed to have a portion 32 wherein the coils are diagonally wrapped around the shank portion and having a predetermined distance between each coil and a portion 34 wherein the spring members are formed in a close pattern about the holes 26 formed in the shank portion as illustrated. In this area of shank portion 22, the spring coils are adjacent to one another and the axis thereof is substantially aligned with the axis of the fastener 10 as illustrated. It should be noted that there is a section 21 under head 20 that is pressed into the panel member 12 securing the head of the fastener 20 to the panel member 12. Head 20 and section 21 can be replaced with alternate configurations depending on the particular application for fastener 10, the only requirement being that a surface of sufficient dimensions be provided to engage one end of spring portion 32 since spring member 30 must be held in place on shank portion 22 during the fastener installation/removal process. This requirement can be met with a surface which is an integral part of fastener 10 or, for example, by a separate, adjacent plate member. Positioned within aperture 24 is a stepped pin 35 loaded (compression force applied thereto) by internal spring 37. Pin 35 comprises a series of cylindrical step portions 36, 38, 40 and 42 of differing diameters, joined by angled, or stepped, surface portions 44, 46 and 48, respectively, as illustrated. A hollowed end portion 49, or recess, in cylindrical portion 42 is provided to enable a driver access thereto for the reasons set forth hereinafter. Pin member 35 is loaded by spring 37 and held in place within aperture 24 by angular step 44 resting against ball members 28 (FIG. 3c).

Ball members 28 are in the retracted position until usage, held there in place by portion 34 of spring 30. When fastener 10 is inserted into the aperture in panel member 14 as shown in FIG. 3(b), spring 30 is compressed back toward the head 20 of the fastener and moves away from ball members 28 it was initially forcing inward as shown in FIG. 3(a). As fastener 10 passes through aperture 15 formed in panel 14, the ball members are still in their retracted position because the diameter of the hole is approximately the same size as the inside diameter of spring 30 that once contained it. When fastener 10 passes completely through the aperture in panel 14 as shown in FIG. 3(c), spring portion 37 pushes the pin forward (in the direction of arrow 60), forcing the ball members 28 to expand in the radial direction thus securing the fastener to the panel member 14. As illustrated in FIG. 3(c), the spring 30 is now substantially compressed and internal spring 37 in its expanded position, pin member 35 being forced towards the probe end 23 of the shank portion of fastener 10. At this point, the bottom surface of the spherical ball members 28 are in contact with the surface of cylindrical portion 38 and angled surface 44 such that the ball members 28 have been forced to protrude from openings 26. The diameter of cylindrical portion 38 is selected such that ball members 28 protrude sufficiently to secure the fastener to panel member 14 yet provides enough available material adjacent openings 26 when the edges are staked to retain the ball members within aperture 24 notwithstanding large axial forces applied to pin 35. At this point spring 30 applies a compressive force (preload) to the rear surface of panel member 14 and the radially expanded locked ball members 28. It should be noted that during the initial fabrication of the fastener 10, the holes 26 in the shank portion 22 are first formed of a diameter greater than a diameter of the ball members 26. The internal spring member 37 and the pin member 35 are then placed in the aperture 24 within the shank portion 22 and the ball members 28 are then placed in the apertures in the position shown in FIG. 3(a). At this point a staking tool is used to reform, or stake, the edges of the holes 26 in an amount such that portion 27 of the holes 26 are smaller than the diameter of the ball members 28 thus preventing the ball members from exiting through the holes they are in, completing the installation. In order to remove plate member 12, a driver tool 63 is positioned in recess 49 of pin 35 and pin 35 is pushed axially toward head 20 in the direction of arrow 64 as shown in FIG.

3(d). This action compresses spring 37 and enables the balls 28 to move down the angled surface 46 adjacent cylindrical portion 40. This action is aided by compression spring 30 which also acts, due to its ejection load, to move the fastener in the direction of arrow 64 and thus to automatically eject the fastener panel member 14. As the ball members 28 retract to the proper depth, fastener 10 is ejected from the hole in panel member 14 enabling, in the application described, the airbag unit attached to support plate 12 to be removed. As the fastener is ejected, spring member 30 positions automatically itself over ball members 28 to maintain them in the retracted position, enabling the fasteners to be reused.

It is apparent that the inner stepped pin 35 in the embodiment shown in the previous figures is restrained from exiting aperture 4 by the interference of the ball members 28. As described hereinabove, the balls are captivated to the fastener by a staking process on the exterior shank portion of the pin. The location of the stepped pin against the ball can result in a major mechanical advantage causing the ball members 28 to be ejected from openings 26 if a sufficient load is applied axially to the inner stepped pin 35 when the airbag detonates. This load can force the balls radially outward and against the captivating staking portion, pushing the staked material away and allowing the ball members 28 to leave its original confines and also allowing the inner stepped pin 35 and spring 37 to exit their original location within aperture 24.

Figure 4A:
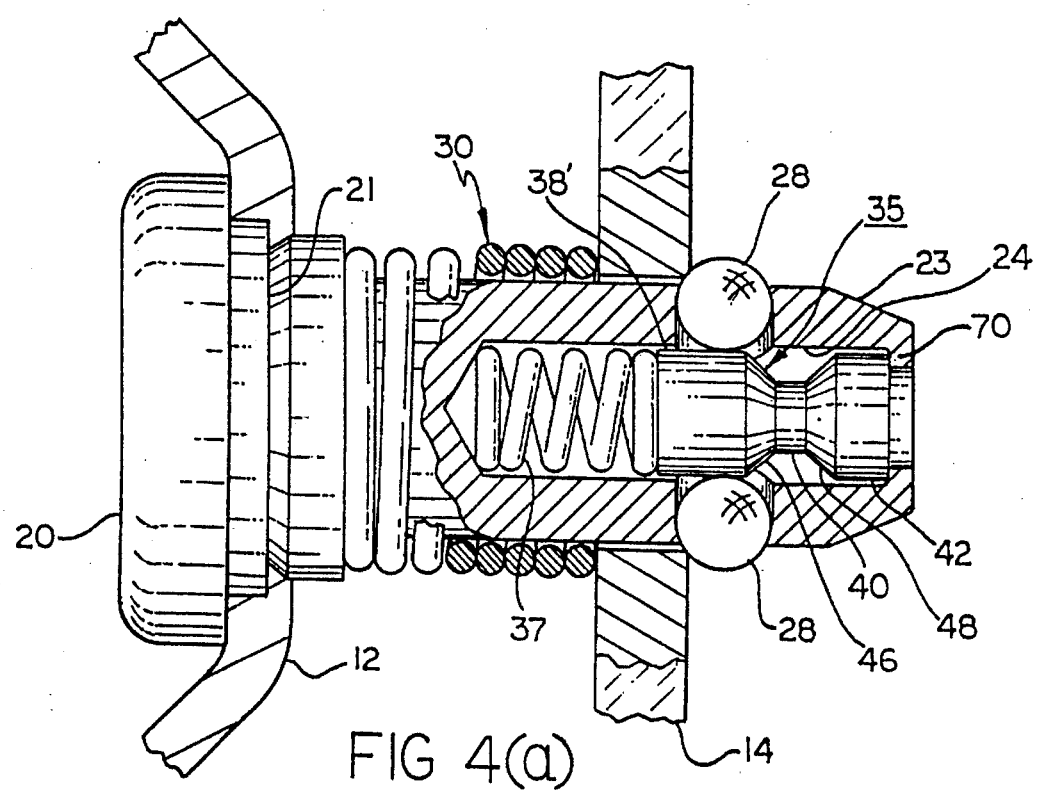
FIGS. 4(a) and 4(b) illustrate another embodiment of the fastener.
Figure 4B:
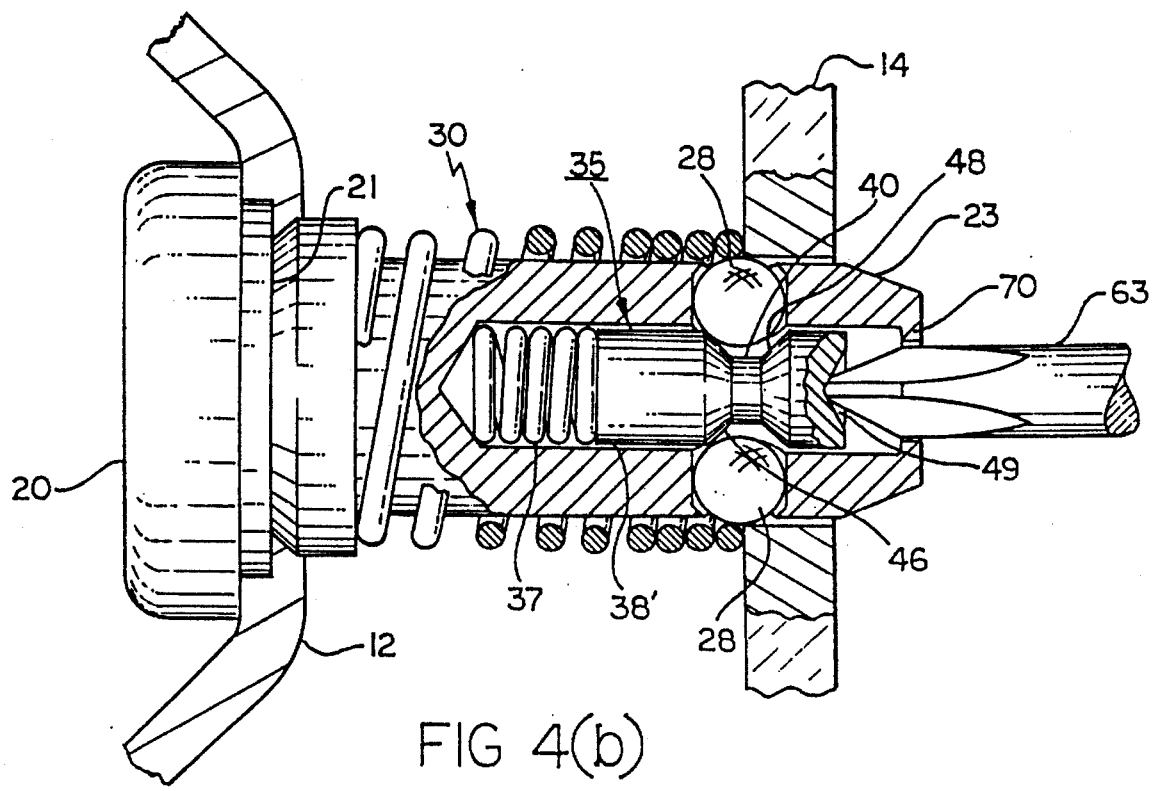

Referring now specifically to FIGS. 4(a) and 4(b), an alternate embodiment of the present invention is illustrated wherein the radial loading of the ball members 28 are eliminated by removing the inner pin retainer step portion 36. (The same reference numerals utilized in both embodiments describe identical components). FIG. 4(a) illustrates the captivating step of the installation process with ball members contacting cylindrical portion 38' (equivalent to FIG. 3(c)), FIG. 4(b) illustrating the release step with ball members 28 forced into the valley between surface portions 46 and 48, (equivalent to FIG. 3(d)). Therefore, any axial load or impact cannot affect the dislodging of the ball members 28. In this embodiment, the ball staking process is only concerned with just holding the ball members 28 in place and not the effect of the inner pin step member 44 reacting on it. To prevent the pin member 35 and spring 37 from exiting the pin, it is captivated by forming additional material, at the end of aperture 24 to a diameter that is smaller than the diameter of the pin member 35. As shown in the figures, the chamfered end 23 of the fastener has an angled portion 70, the resulting aperture diameter at this end of the fastener being smaller than the diameter of step portion 42. What is significant is the amount of material that can be used to captivate the pin member 35 which has considerably more mass than the ball staking process which is somewhat limited in displacing material. Also, the opportunity to create any mechanical advantage to activate the removal of the pin member 35 is eliminated by removing the pin retainer angular step 44 and extending cylindrical portion 38 to form cylindrical portion 38' as illustrated.

An additional technique for minimizing the radial type forces applied to ball members 28 if large axial forces are applied to pin member 35 is to increase the diameters of aperture 24 and cylindrical portion 36 and increase the angle of inclined portion 44. In this configuration, the contact point of the ball members 28 is such that the primary force applied thereto forces the ball members against the adjacent end portion 29 (FIG. 3(c)) instead of radially outward.

Figure 5:
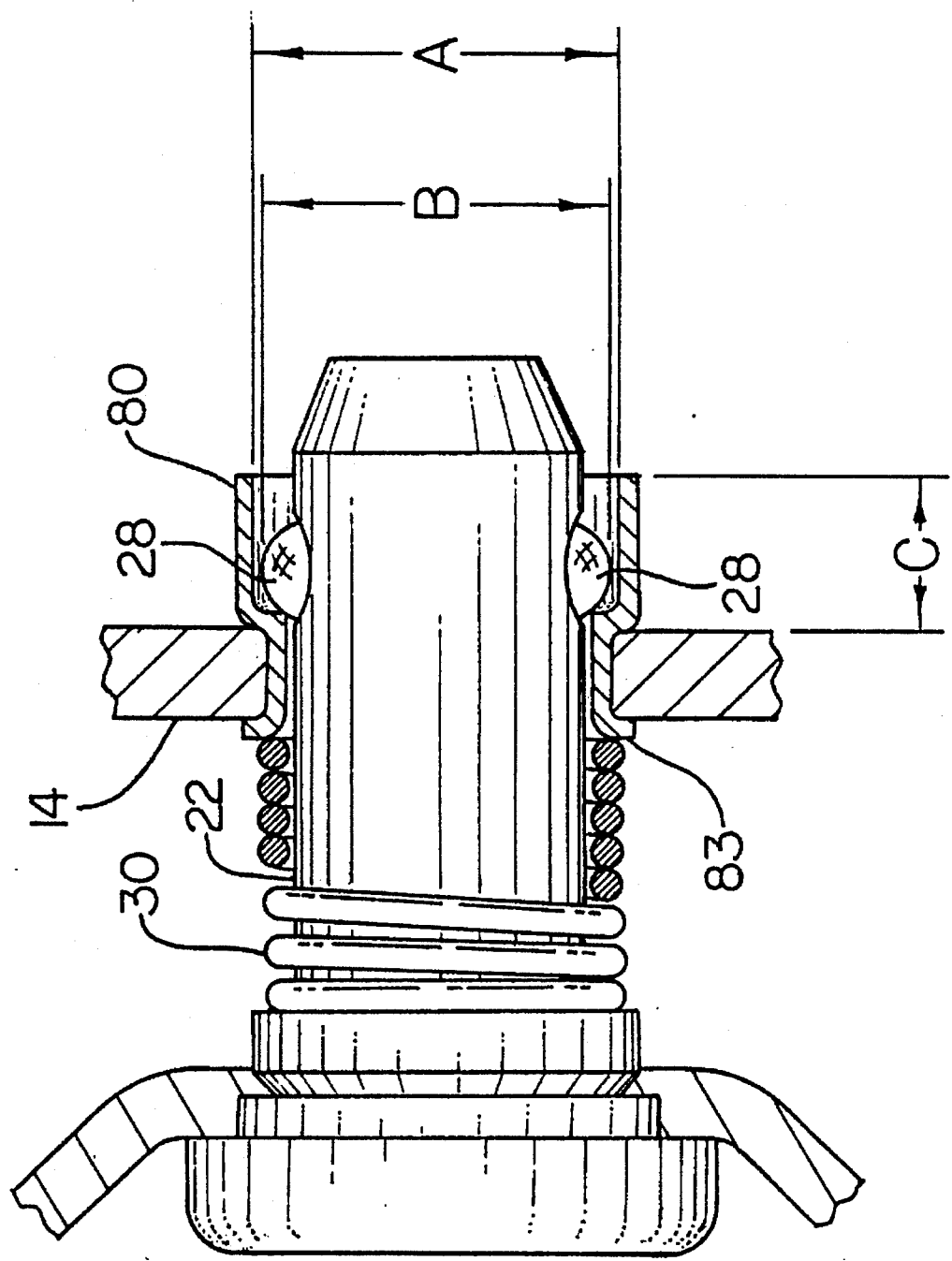
FIG. 5 illustrates the tubular member of the present invention.

Another technique for ensuring that the ball members 28 are retained within shank portion 22 is illustrated in FIG. 5. Specifically, and in accordance with the teachings of the present invention, a tubular shaped member 80 with a flange portion 83 is fixedly positioned adjacent ball lock members 28 as illustrated. The stepped internal diameter of tubular member 80 is maximized (dimension A) when positioned directly adjacent the external diameter of ball members 28. The tubular section internal diameter A is slightly larger than the diameter of the across the balls diameter (dimension B) of the fastener. This resulting clearance is adequate to protect the function of the fastener while also protecting the ball members 28 from escaping its operative position (see FIGS. 3(c) and 4(a)) due to unforeseeable events and conditions, such as excessive vibrations. The minimum length of the tubular portion (distance C) is selected to cover the ball members 28 for predetermined axial movement caused by vibrations or other factors.

Figure 6D:
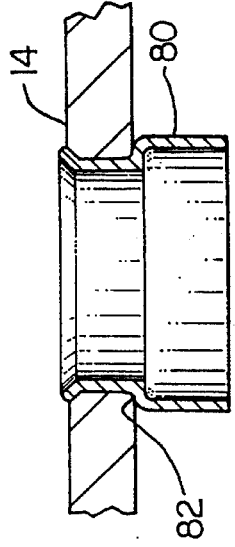
FIG. 6(a)–6(e) illustrate various techniques for joining the tubular member to an adjacent plate member.
Figure 6F:
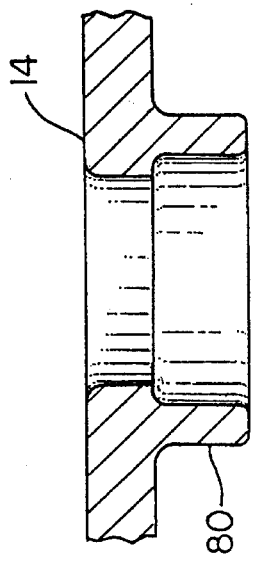
Figure 6E:
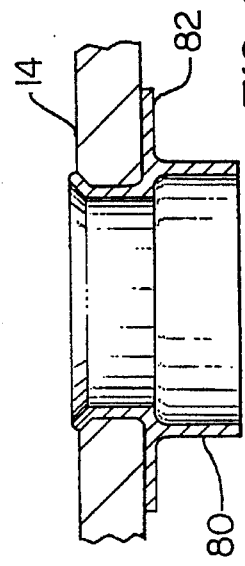
Figure 6A:
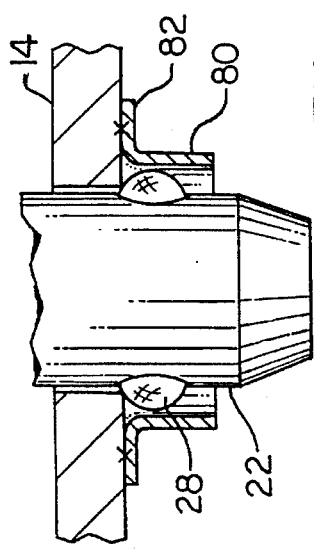
Figure 6B:
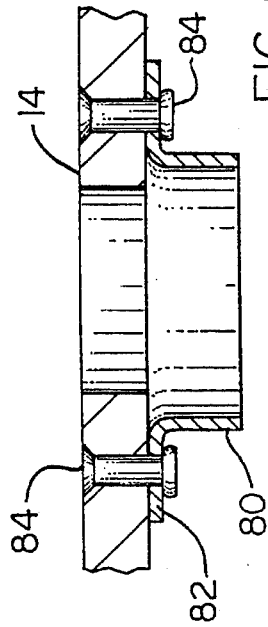
Figure 6C:
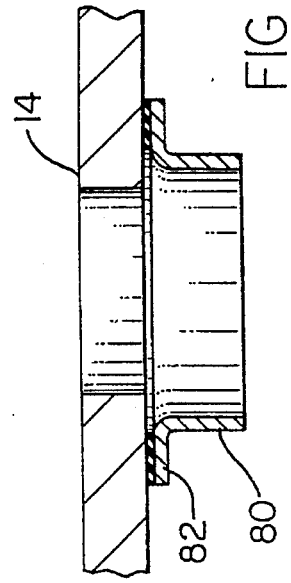

FIGS. 6(a)-6(f) illustrate various ways tubular member 80 can be attached to mounting panel 14. In particular, FIG. 6(a) illustrates member 80 welded to panel 14; FIG. 6(b) illustrates rivets 84 securing member 80 to panel 14 through flange portion 82; FIG. 6(c) illustrates flange portion 82 bonded to panel 14 and FIG. 6(d) illustrates a modified flared flange portion 82' (similar to the flared flange 83 shown in FIG. 5) engaging the angularly shaped, or chamfered internal diameter of aperture 15. FIG. 6(e) illustrates flange portion 82 having an extended diameter for improved axial support against mounting panel 14. FIG. 6(f) illustrates an alternate embodiment wherein the tubular portion 80 is included as a portion of panel member 14'.

For the application noted hereinabove, the present invention allows an operator to quickly install the airbag unit from the driver's side, probe end 23 being chamfered to allow easy alignment. The operator takes the airbag assembly on panel 12 and presses it towards the matching plate where the fasteners are inserted into the mating holes. As the operator continues to push inward toward the steering wheel, an audible click is heard which signifies installation is complete. In this application, the fastener of the present invention does not require the steering wheel to be rotated. To remove the unit, a small diameter tool, like a crosspoint screwdriver, is simply inserted into the end of the fastener opposite the head to engage the center pin therein. When the center pin is pushed or depressed, the ball members retract and the outer spring assists in the quick ejection of the steering wheel plate. What is more important, no rotational loosening or tightening is required because there are no threaded portions. In contradistinction thereto, current procedure requires the operator to rotate the steering wheel, use special tools and work behind the wheel and dashboard for assembly. The operator must first locate and then install and remove four screws and their associated nuts.

Although particularly adapted for use in airbag installations as described above, the improved fastener of the present invention can be used in other applications requiring pushbutton type fasteners, the pushbutton fastener of the present invention being less complicated and less expensive than prior art devices because there are fewer parts required for its operation. The release operation is very simple and, as noted hereinabove, is accomplished by accessing the far end of the fastener, an arrangement which is required in many applications. In addition, after release, the fastener is available for reuse in the field.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt to a particular situation or material the teaching of the invention without departing from its essential teachings.

What is claimed:

1. A protector member for use with a push button type fastener, said fastener comprising an elongated shank having an outside surface and a first end terminating in a second end spaced from said first end, said elongated shank extending in a longitudinal axial direction; means defining an aperture extending inwardly from said second end of said elongated shank along the longitudinal axis of said elongated shank; means defining an opening in said elongated shank that connects said aperture to the outside surface of said elongated shank; and a retention member having first and second surface portions positioned in said opening; said first surface portion of said retention member extending from the outside surface of said elongated shank, said elongated shank extending through an aperture formed in a panel member; said protector member comprising a tubular shaped member having an internal diameter, the internal diameter of said tubular shaped member comprising a substantially continuous surface, said continuous surface not having shaped areas that coact with said retention member, said tubular shaped member being positioned about the elongated shank of said fastener adjacent to said first surface portion of said retention member; and means for attaching said tubular member to said panel member.

2. The protector member of claim 1 wherein said attaching means comprises a flange portion which extends from said tubular shaped member.

3. The protector member of claim 2 wherein clearance is provided between said first surface portion of said retention members and the internal diameter of said tubular shaped member.

4. The protector of claim 3 wherein the length of said tubular shaped member is sufficient to cover at least a portion of said first surface portion of said ball retention members if the elongated shank is caused to move in the longitudinal axial direction of said fastener because of external forces.

5. The protector of claim 2 wherein said flange portion is welded to said panel member.

6. The protector of claim 2 wherein said flange portion is riveted to said panel member.

7. The protector of claim 2 wherein said flange portion is bonded to said panel member.

8. The protector of claim 2 wherein said flange portion has a flared end, said flared end engaging a shaped internal diameter of said panel member aperture.

9. A push button type fastener, comprising an elongated shank having an outside surface and a first end terminating in a second end spaced from said first end, said elongated shank portion extending in a longitudinal direction; means defining an aperture extending inwardly from said second end of said elongated shank along the longitudinal axis of said elongated shank; means defining an opening in said elongated shank that connects said aperture to the outside surface of said elongated shank; and a retention member having a first and second surface portions positioned in said opening; said first surface portion of said retention member extending from the outside surface of said elongated shank, said elongated shank extending through an aperture formed in a panel member, said panel members comprising a tubular shaped portion having an internal diameter, the internal diameter of said tubular shaped member comprising a substantially continuous surface, said continuous surface not having shaped areas that coact with said retention member, said tubular shaped member being positioned about the elongated shank of said fastener adjacent to said first surface portion of said retention member.

10. The fastener of claim 9 wherein clearance is provided between said first surface portion of said retention members and the internal diameter of said tubular shaped member.

11. The fastener of claim 10 wherein the length of said tubular shaped member is sufficient to cover at least a portion of said first surface portion of said ball retention members if said elongated shank portion is caused to move in the longitudinal axial direction of said fastener because of external forces.

* * * * *